United States Patent [19]

Mahalingaiah et al.

[11] Patent Number: 5,813,045

[45] Date of Patent: Sep. 22, 1998

[54] CONDITIONAL EARLY DATA ADDRESS GENERATION MECHANISM FOR A MICROPROCESSOR

[75] Inventors: Rupaka Mahalingaiah; Thang M. Tran; David B. Witt, all of Austin, Tex.

[73] Assignee: Advanced Micro Devices, Inc., Sunnyvale, Calif.

[21] Appl. No.: 685,653

[22] Filed: Jul. 24, 1996

[51] Int. Cl.⁶ .................................................... G06F 9/26
[52] U.S. Cl. ..................... 711/204; 711/202; 711/213; 711/214; 711/215; 395/383; 395/387
[58] Field of Search .................................. 395/387, 389, 395/383, 571, 584, 414, 421.03, 421.01, 495, 496, 421.1, 421.05; 711/202, 204, 213, 214, 215, 220; 895/387, 389, 383, 571

[56] References Cited

U.S. PATENT DOCUMENTS

| | | |
|---|---|---|
| 4,044,338 | 8/1977 | Wolf .......................................... 365/49 |
| 4,373,182 | 2/1983 | Schultz et al. ...................... 395/421.05 |
| 4,409,654 | 10/1983 | Wada et al. ........................ 395/421.03 |
| 4,453,212 | 6/1984 | Gaither et al. ........................... 395/402 |
| 4,807,115 | 2/1989 | Torng ...................................... 395/391 |
| 4,855,105 | 8/1989 | Kuriyama et al. ...................... 395/582 |
| 4,858,105 | 8/1989 | Kuriyama et al. ...................... 395/582 |
| 5,168,557 | 12/1992 | Shibuya .................................. 395/383 |
| 5,226,126 | 7/1993 | McFarland et al. .................... 395/394 |
| 5,226,130 | 7/1993 | Favor et al. ............................. 395/555 |
| 5,517,657 | 5/1996 | Rodgers et al. ......................... 395/800 |
| 5,519,841 | 5/1996 | Sager et al. ............................. 395/412 |
| 5,546,593 | 8/1996 | Kimura et al. .......................... 395/800 |
| 5,568,630 | 10/1996 | Killian et al. ........................... 395/376 |

FOREIGN PATENT DOCUMENTS

| | | |
|---|---|---|
| 0259095 | 3/1988 | European Pat. Off. . |
| 0381471 | 8/1990 | European Pat. Off. . |
| 0459232 | 12/1991 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

Intel, "Chapter 2: Microprocessor Architecture Overview," pp. 2–1 through 2–4.

Michael Slater, "AMD's K5 Designed to Outrun Pentium," Microprocessor Report, vol. 8, No. 14, Oct. 24, 1994, 7 pages.

Sebastian Rupley and John Clyman, "P6: The Next Step?," PC Magazine, Sep. 12, 1995, 16 pages.

Tom R. Halfhill, "AMD K6 Takes On Intel P6," BYTE, Jan. 1996, 4 pages.

*Primary Examiner*—Eddie P. Chan
*Assistant Examiner*—Than V. Nguyen
*Attorney, Agent, or Firm*—B. Noel Kivlin; Conley, Rose & Tayon

[57] ABSTRACT

An apparatus is provided, including one or more early address generation units which attempt to perform data address generation upon decode of an instruction which includes a memory operand. The early address generation units may be successful at generating the data address if the logical data address is formed from a displacement only. Additionally, the early address generation unit may be successful at generating the data address if the logical data address is formed from the displacement and register operands which are available upon decode of the instruction. Data address generation latency may be shortened. If register operands are employed for forming the address and the register operands are not available, the data address may be generated in a functional unit at the execute stage. Therefore, the early address generation mechanism is a conditional mechanism which provides the data address early if the operands are available, and which provides the data address in a more conventional fashion if the operands are not available. In one embodiment, the early address generation units add the displacement value to the segment base address corresponding to the segment register selected by the instruction. The displacement/segment base address addition may be performed while awaiting register operands.

18 Claims, 7 Drawing Sheets

CONDITIONAL EARLY DATA ADDRESS GENERATION MECHANISM FOR A MICROPROCESSOR

BACKGROUND OF THE INVENTION

1. Field of the Invention

This invention is related to the field of microprocessors and, more particularly, to data address generation mechanisms within microprocessors.

2. Description of the Relevant Art

Superscalar microprocessors achieve high performance by simultaneously executing multiple instructions during a clock cycle and by specifying the shortest possible clock cycle consistent with the design. As used herein, the term "clock cycle" refers to an interval of time during which the pipeline stages of a microprocessor perform their intended functions. Storage devices (e.g. registers or arrays) capture their values in response to a clock signal defining the clock cycle. For example, storage devices may capture a value in response to a rising or falling edge of the clock signal.

Microprocessor designers often design their products in accordance with the x86 microprocessor architecture in order to take advantage of its widespread acceptance in the computer industry. Because the x86 microprocessor architecture is pervasive, many computer programs are written in accordance with the architecture. X86 compatible microprocessors may execute these computer programs, thereby becoming more attractive to computer system designers who desire x86-capable computer systems. Such computer systems are often well received within the industry due to the wide range of available computer programs.

The x86 microprocessor architecture includes an address translation mechanism. Address translation involves the mapping of an address created by the microprocessor to an address actually used to access memory. Generally speaking, an address is a value which uniquely identifies a byte within memory. One or more bytes contiguous to the identified byte may be accessed by presenting an address and a number of bytes to access to the memory.

Address translation mechanisms are employed for many reasons. For example, the address translation mechanism may be used to define certain microprocessor-created addresses as not presently stored within the main memory. Data corresponding to addresses which are not stored within main memory may be stored on a disk drive. When such an address is accessed, the corresponding data may be swapped with data currently stored in main memory. The address translation for the data swapped onto the disk drive is invalidated and an address translation is defined for the data swapped into memory. In this manner, the computer program may access an address space larger than the main memory can support. Additionally, address translation mechanisms are used to protect the data used by one program from access and modification by another program executing within the same computer system. Different areas of main memory are allocated to each program, and the translations for each program are constrained such that any address created by one program does not translate to a memory location allocated to another program. Many other reasons for employing address translation mechanisms are well known.

The x86 address translation mechanism includes two levels. A first level, referred to as segmentation, takes a logical address generated according to instruction operands and produces a linear address. The second level, referred to as paging, translates the linear address to a physical address (i.e. the address actually used to access memory). The linear address is equal to the physical address in cases where the paging mechanism is disabled.

For a particular data access to memory, the logical address comprises the result of adding certain operands defined by the instruction. As used herein, the term "operand" refers to an input value operated upon by an instruction. Operands are referred to as register operands if the value is stored in a register within the microprocessor. Conversely, operands are referred to as memory operands if the value is stored in a memory location. The memory location is identified by forming a data address. In the x86 microprocessor architecture, an instruction may form the logical data address of a memory operand using up to two register values and up to one displacement value. The displacement is a value encoded into a particular field of the instruction, and is intended for use in forming the logical data address. The register values used to form the logical data address are also referred to herein as register operands.

Upon generating the logical address, the linear address may be generated. A set of segment registers and associated "shadow registers" store segmentation translation information. The segment selectors are accessible via instructions, while the shadow registers are accessible only to microprocessor hardware. As used herein, the term "segment registers" will be used to refer to the segment registers and associated shadow registers. Each instruction accesses a particular segment register by default when forming linear addresses. Additionally, an instruction may specify a segment register other than the default via an instruction prefix defined in the x86 microprocessor architecture.

Generally speaking, segmentation translation information includes a segment base address, a segment limit, and segment access information. The segment base address is the linear address defined for a logical address having the arithmetic value of zero. Linear addresses within the segment have an arithmetic value which is greater than or equal to the segment base address. The segment limit defines the largest logical address which is within the segment. Logical addresses larger than the segment limit result in an exception being generated by the microprocessor. The segment access information indicates if the segment is present in memory, the type of segment (i.e. code or data, and various subtypes), the addressing mode of the segment, etc. The linear address corresponding to a particular logical address is the result of adding the segment base address to the logical address. Additional information regarding the x86 address translation mechanism may be found in the publication: "PC Magazine Programmer's Technical Reference: The Processor and Coprocessor" by Hummel, Ziff-Davis Press, Emeryville, Calif., 1992. This publication is incorporated herein by reference in its entirety.

As used herein, the term "exception" refers to an interruption in the execution of an instruction code sequence. The exception is typically reported to a centralized handling mechanism which determines an appropriate response to the exception. Some exceptions (such as branch misprediction, for example) may be handled by the microprocessor hardware. The hardware performs corrective actions and then restarts instruction execution. Other exceptions may cause a microcode routine within the microprocessor to be executed. The microcode routine corrects the problem corresponding to the exception. Instruction execution may subsequently be restarted at the instruction causing the exception or at another instruction subsequent to the instruction, dependent upon the corrective actions taken. A third type of exception causes execution of special instruction code stored at an address defined for the exception. The special instruction code determines the reason for the exception and any corrective actions. The third type of exception is architecturally defined, such that software may be written to handle the exception. Upon execution of a particular instruction (a return instruction), instruction execution is typically restarted at the instruction which causes the exception. Segment limit violations are an example of the third type of exception. Selection of which method to handle a particular exception with in a microprocessor is dependent upon the relative frequency at which the exception occurs, and the associated performance impact of handling the exception in the various different manners.

Unfortunately, the generation of a logical address involving up to three operands followed by generation of a linear address from the logical address leads to significant latency in data accesses. Because the logical address may depend upon registers, it is typically not generated until the associated instruction arrives in a functional unit. Generating the logical address typically requires one to two clock cycles (depending upon the number of operands), followed by a linear address generation requiring yet another clock cycle. Delays in address generation result in delays in receiving the accessed data. Instructions dependent upon the accessed data are thereby delayed from executing as well. For a microprocessor configured to generate a linear address in a single clock cycle, a four input adder is needed to handle two register operands, a displacement, and a segment base address. The four input adder may negatively affect clock cycle time of the microprocessor.

SUMMARY OF THE INVENTION

The problems outlined above are in large part solved by an apparatus in accordance with the present invention. The apparatus described herein includes one or more early address generation units which attempt to perform data address generation upon decode of an instruction which includes a memory operand. The early address generation units may be successful at generating the data address if the logical data address is formed from a displacement only. Additionally, the early address generation unit may be successful at generating the data address if the logical data address is formed from the displacement and register operands which are available upon decode of the instruction. Data address generation latency may be advantageously shortened, improving performance of a microprocessor which incorporates the apparatus. In one particular embodiment, up to 2 clock cycles of data address generation latency may be eliminated.

If register operands are employed for forming the address and the register operands are not available, the data address may be generated in a functional unit at the execute stage. Therefore, the early address generation mechanism is a conditional mechanism which provides the data address early if the operands are available, and which provides the data address in a more conventional fashion if the operands are not available.

In one embodiment, the early address generation units add the displacement value to the segment base address corresponding to the segment register selected by the instruction. The displacement/segment base address addition may be performed while awaiting register operands. Advantageously, the four input adder employed to produce the linear data address in a single clock cycle may be reduced to a two input adder (performed in a clock cycle prior to receipt of register operands) and up to a three input adder for adding the displacement/segment base address sum to the register operands. Because the displacement/segment base address addition is performed as the instruction is decoded, the two clock cycle addition process does not impact performance. In fact, performance may be enhanced.

Broadly speaking, the present invention contemplates an apparatus for computing a data address comprising a decode unit, a register operand storage, an early address generation unit, a functional unit, and a load/store unit. The decode unit is configured to decode an instruction, including detection of a displacement, a selected segment register which stores a segment base address, and a register operand corresponding to the instruction. Coupled to the decode unit, the register operand storage receives an indication of the register operand from the decode unit. The register operand storage is configured to store the register operand upon generation of the register operand via execution of another instruction prior to the instruction in an instruction code sequence. Additionally, the register operand storage is configured to convey the register operand upon receipt of the indication if the register operand is stored therein, or a tag identifying the register operand if the register operand is not stored therein. The register operand storage conveys the operand or tag upon receipt of the indication. Coupled to both the decode unit and the register operand storage, the early address generation unit is configured to generate a first data address corresponding to the instruction. Furthermore, the early address generation unit is configured to assert a validity indication if the register operand is received from the register operand storage. Additionally, the early address generation unit is configured to assert the validity indication if the instruction excludes the register operand for address generation. The early address generation unit is configured to generate the first data address by adding the displacement to the segment base address and further adding the register operand, if included. The functional unit is coupled to receive the displacement and the register operand, and is configured to generate a second data address by adding the displacement to the register operand, if included. Finally, the load/store unit is coupled to the early address generation unit and the functional unit. The load/store unit receives the first data address and the second data address, and selects between them in response to the validity indication provided by the early address generation unit.

The present invention further contemplates a method for efficient data address generation. A first data address is generated. The first data address corresponds to an instruction, and is generated upon decode of the instruction. The first data address is valid if a register operand is employed to form the first data address is provided. The first data address is invalid if the register operand is not provided. A second data address corresponding to the instruction is generated by a functional unit, prior to executing the instruction in that functional unit. The first data address is selected by a load/store unit if the first data address is valid. Conversely, the second data address is selected by the load/store unit if the first data address is invalid.

The present invention still further contemplates a method for data address generation in a microprocessor. A first data address corresponding to an instruction is generated upon decode of the instruction. The first data address is valid if a register operand is not employed to form the first data address. The first data address is invalid if the register operand is employed. A second data address corresponding to the instruction is generated upon execution of the instruction. A load/store unit selects the first data address if the first data address is valid, or the second data address if the first data address is invalid.

BRIEF DESCRIPTION OF THE DRAWINGS

Other objects and advantages of the invention will become apparent upon reading the following detailed description and upon reference to the accompanying drawings in which.

Figure 1:
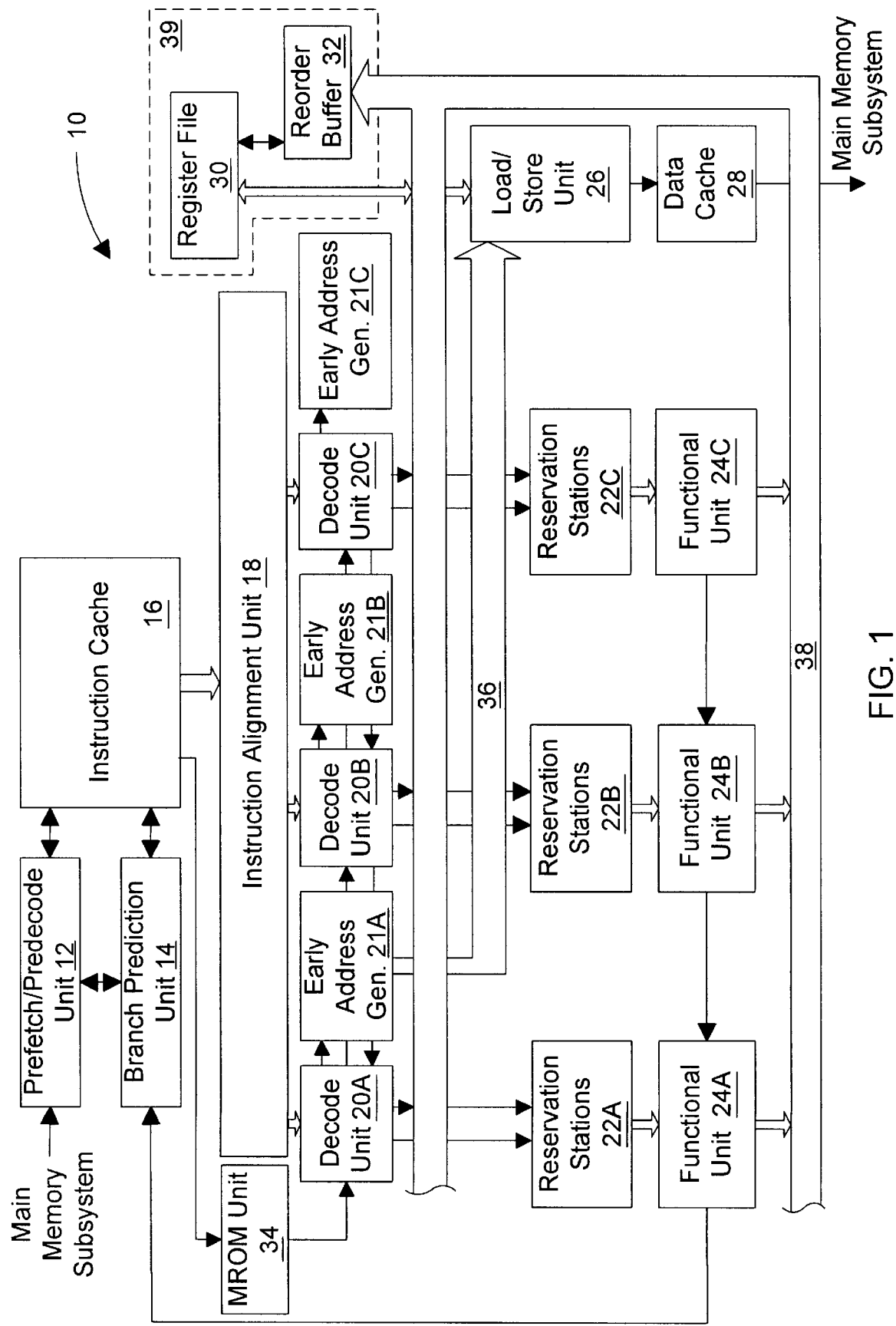
FIG. 1 is a block diagram of a superscalar microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of early address generation units 21A–21C, a plurality of reservation stations 22A–22C, a plurality of functional units 24A–24C, a load/store unit 26, a data cache 28, a register file 30, a reorder buffer 32, and an MROM unit 34. Blocks referred to herein with a reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is coupled to instruction cache 16. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. Early address generation units 21 are coupled to respective decode units 20 and to load/store unit 26 via a plurality of early address buses 36. Finally, MROM unit 34 is coupled to decode units 20.

Generally speaking, microprocessor 10 is configured to conditionally generate data addresses using early address generation units 21. An early address generation unit 21 is coupled to each decode unit 20. If an instruction being decoded by a particular decode unit 20A–20C includes a memory operand, the corresponding early address generation unit 21A–21C attempts to form the data address. Early address generation units 21 may form the data address upon decode of the instruction if the logical data address is formed from a displacement only. Additionally, early address generation units 21 may form the data address if register operands used to form the logical data address are available within reorder buffer 32 or register file 30 at decode of the instruction. A register operand is available if either reorder buffer 32 or register file 30 is storing the register operand. In other words, the register operand is available if the instruction which generates the register operand has been executed and has produced a result. Advantageously, data address generation begins when the instruction is decoded if the register operands forming the data address are available. Data access latency may be decreased since the data address generation begins as the instruction is decoded. If the register operands forming the data address are not available, the data address is formed upon execution of the instruction in the corresponding functional unit 24A–24C. Early address generation units 21 convey generated addresses to load/store unit 26 upon early address buses 36, along with an indication of the validity of the address. If the address is not valid, load/store unit 26 awaits the address from functional units 24.

Additionally, early address generation units 21 may be configured to "hide" the linear address generation portion of data address generation within the logical address generation mechanism. Effectively, the logical and linear address calculations are merged. Early address generation units 21 receive the segment base addresses corresponding to each segment register from load/store unit 26. Early address generation units 21 select one of the segment base addresses dependent upon the default segment register corresponding to the instruction being decoded, as well as dependent upon any overriding specification via a prefix byte within the instruction. Early address generation units 21 add the selected segment base address to the displacement coded into the instruction. If no displacement is included, a displacement value of zero is used. The sum is subsequently added to any register operands (according to the instruction encoding). The linear address is thereby successfully created. Advantageously, the clock cycle previously devoted to generating the linear address from the logical address is eliminated. Instead, the segment base address is added into the address operands while the corresponding instruction is decoded.

Linear address generation latency may be decreased, decreasing overall data access time. In one particular embodiment, linear address generation is decreased from 2–3 clock cycles of address calculation in functional units 24 and load/store unit 26 (dependent upon the number of logical address operands) to 1–2 clock cycles of address calculation within early address generation units 21. In addition, the address generation is started at an earlier clock cycle than if functional units 24 perform the address generation. It is noted that, in the absence of the presently described apparatus, load/store unit 26 typically performs the logical to linear address calculation upon receipt of the logical address from one of functional units 24. Microprocessor 10 may enjoy increased performance due to the decreased latency of linear address generation.

In one embodiment, microprocessor 10 generates 32 bit linear addresses. Additionally, segment base addresses are 32 bits. However, for compatibility with previous versions of x86 microprocessors, logical addresses may be 16 bit or 32 bit values. A bit within the segment access information for the code segment (i.e. the segment represented by the CS segment register) indicates whether logical addresses are 16 bit or 32 bit values. Additionally, instructions may override the bit with a prefix byte (similar to overriding the default segment register).

When 16 bit logical addresses are used, another problem is incurred. The displacement and any register operands are added together and the result truncated to 16 bits to form the logical address (i.e. prior to adding the result to the segment base address). By adding the segment base address (comprising 32 bits) to the displacement and subsequently adding the generated 32 bit sum to any register operands, the truncation to 16 bits is lost. Early address generation units 21 may be configured to detect an arithmetic carry between the least significant 16 bits and the most significant 16 bits during each addition performed to generate a data address. If the logical data address is 16 bits and a carry is detected, early address generation units 21 indicate that the corresponding early address is invalid. Functional units 24 subsequently generate the correct address.

Instruction cache 16 is a high speed cache memory provided to store instructions. Instructions are fetched from instruction cache 16 and dispatched to decode units 20. In one embodiment, instruction cache 16 is configured to store up to 32 kilobytes of instructions in an 8 way set associative structure having 16 byte lines (a byte comprises 8 binary bits). Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to instruction cache 16 recording a miss for the instructions in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below.

One encoding of the predecode tags for an embodiment of microprocessor 10 employing the x86 instruction set will next be described. If a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The op code of an instruction may thereby be located within an instruction which may be directly decoded by decode units 20 as the byte associated with the first clear functional bit in the instruction. For example, a fast path instruction including two prefix bytes, a Mod R/M byte, and an SIB byte would have start, end, and functional bits as follows:

| | |
|---|---|
| Start bits | 10000 |
| End bits | 00001 |
| Functional bits | 11000 |

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20. A listing of exemplary x86 instructions categorized as fast path instructions will be provided further below.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction.

When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Instructions are selected independently from each set of eight instruction bytes into preliminary issue positions. The preliminary issue positions are then merged to a set of aligned issue positions corresponding to decode units 20, such that the aligned issue positions contain the three instructions which are prior to other instructions within the preliminary issue positions in program order. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Reorder buffer 32 and register file 30 are searched for the corresponding register operands. Reorder buffer 32 and register file 30 may be classified as a "register operand storage", indicated by dashed enclosure 39. Register operands are requested from the register operand storage, and the register operands or a reorder buffer tag identifying the register operand for retrieval from result buses 38 are conveyed from the register operand storage. Although shown as register file 30 and reorder buffer 32 in the present embodiment, register operand storage 39 may comprise any storage from which register operands are provided. Those of skill in the art will appreciate that the x86 register file includes eight 32 bit real registers (i.e., typically referred to as EAX, EBX, ECX, EDX, EBP, ESI, EDT and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocated the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated similar to load/store unit 26 in that any of decode units 20 may dispatch instructions to the floating point unit.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A results bus 38 is included for conveying such results to various destinations.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 subsequently receives the data address of the memory operation from either early address generation units 21 or functional units 24. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the segment base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Although the above description discusses adding two register operands, a displacement, and a segment base address to form a linear address, other values may be included in linear address generation as well. In particular, if microprocessor 10 employs the x86 microprocessor architecture, microprocessor 10 may be configured to generate a constant value indicative of modification of the ESP or EBP register. These registers are often incremented or decremented by a constant value in response to execution of instructions. For example, the POP instruction in 32 bit addressing mode increments the ESP by 4. Similarly, the PUSH instruction decrements the ESP by 4 in 32 bit mode. Instruction alignment unit 18 may be configured to generate a constant for a particular instruction indicative of modification of the ESP or EBP value by those instructions to be concurrently decoded with the particular instruction by microprocessor 10. The constant indicates modification of the ESP or EBP by concurrently decoded instructions which are prior to the particular instruction in program order. Reorder buffer 32 provides a reorder buffer tag indicative of the ESP and EBP value prior to execution of the concurrently decoded instructions. When the ESP or EBP value prior to execution of the concurrently decoded instructions is generated, each of the concurrently decoded instructions which requires the ESP or EBP captures the value and adds the constant to the value to generate the appropriate register operand for use by the instruction. The apparatus described herein may be configured to accept the constant as an additional operand. Additional information may be found in the commonly assigned, co-pending patent application entitled "A Reorder Buffer Including a Speculative Register File Configured to Store Line-Oriented Speculative Register States", Ser. No. 08/550,218, filed Oct. 30, 1995 by Tran, et al. and "A Speculative Register File for Storing Speculative Register States and Removing Dependencies Between Instructions Utilizing the Register", Ser. No. 08/549,961, filed Oct. 30, 1995 by Tran, et al. The referenced patent applications are incorporated herein by reference in their entirety.

Figure 2:
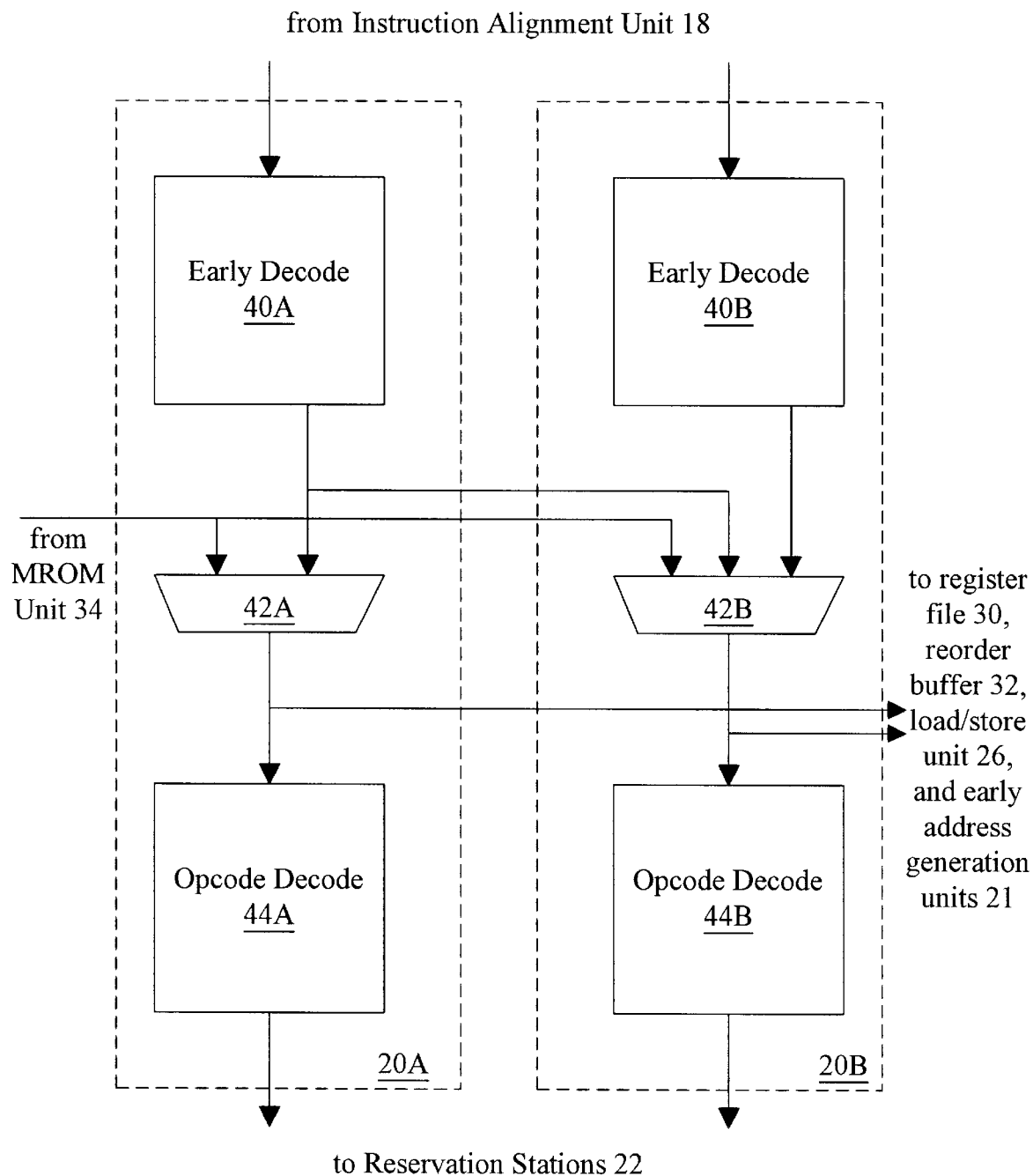
FIG. 2 is a block diagram of one embodiment of a pair of decode units shown in FIG. 1.

Turning now to FIG. 2, a block diagram of one embodiment of decode units 20A and 20B are shown. Each decode unit 20 receives an instruction from instruction alignment unit 18. Additionally, MROM unit 34 is coupled to each decode unit 20 for dispatching fast path instructions corresponding to a particular MROM instruction. Decode unit 20A comprises early decode unit 40A, multiplexor 42A, and opcode decode unit 44A. Similarly, decode unit 20B includes early decode unit 40B, multiplexor 42B, and opcode decode unit 44B.

Certain instructions in the x86 instruction set are both fairly complicated and frequently used. In one embodiment of microprocessor 10, such instructions include more complex operations than the hardware included within a particular functional unit 24A–24C is configured to perform. Such instructions are classified as a special type of MROM instruction referred to as a "double dispatch" instruction. These instructions are dispatched to a pair of opcode decode units 44. It is noted that opcode decode units 44 are coupled to respective reservation stations 22. Each of opcode decode units 44A–44C forms an issue position with the corresponding reservation station 22A–22C and functional unit 24A–24C. Instructions are passed from an opcode decode unit 44 to the corresponding reservation station 22 and further to the corresponding functional unit 24.

Multiplexor 42A is included for selecting between the instructions provided by MROM unit 34 and by early decode unit 40A. During times in which MROM unit 34 is dispatching instructions, multiplexor 42A selects instructions provided by MROM unit 34. At other times, multiplexor 42A selects instructions provided by early decode unit 40A. Similarly, multiplexor 42B selects between instructions provided by MROM unit 34, early decode unit 40A, and early decode unit 40B. The instruction from MROM unit 34 is selected during times in which MROM unit 34 is dispatching instructions. During times in which early decode unit 40A detects a fast path instruction having an SIB byte, the instruction from early decode unit 40A is selected by multiplexor 42B. Otherwise, the instruction from early decode unit 40B is selected. When early decode unit 40A detects a fast path instruction having an SIB byte, an instruction for calculating the address specified by the SIB byte is dispatched to opcode decode unit 44A. Opcode decode unit 44B receives the fast path instruction.

According to one embodiment employing the x86 instruction set, early decode units 40 perform the following operations:

(i) merge the prefix bytes of the instruction into an encoded prefix byte;
(ii) decode unconditional branch instructions (which may include the unconditional jump, the CALL, and the RETURN) which were not detected during branch prediction;
(iii) decode source and destination flags;
(iv) decode the source and destination operands which are register operands and generate operand size information; and
(v) determine the displacement and/or immediate size so that displacement and immediate data may be routed to the corresponding opcode decode unit and early address generation unit.

Opcode decode units 44 are configured to decode the opcode of the instruction, producing control values for functional unit 24. Displacement and immediate data are routed with the control values to reservation stations 22. Displacement data is routed to early address generation units 21 for use in generating a data address. Additionally, the selected segment register corresponding to the instruction is routed to early address generation units 21.

Since early decode units 40 detect operands, the outputs of multiplexors 42 are routed to register file 30 and reorder buffer 32. Operand values or tags may thereby be routed to reservation stations 22. Additionally, memory operands are detected by early decode units 40. Therefore, the outputs of multiplexors 42 are routed to load/store unit 26. Memory operations corresponding to instructions having memory operands are stored by load/store unit 26.

Figure 3:
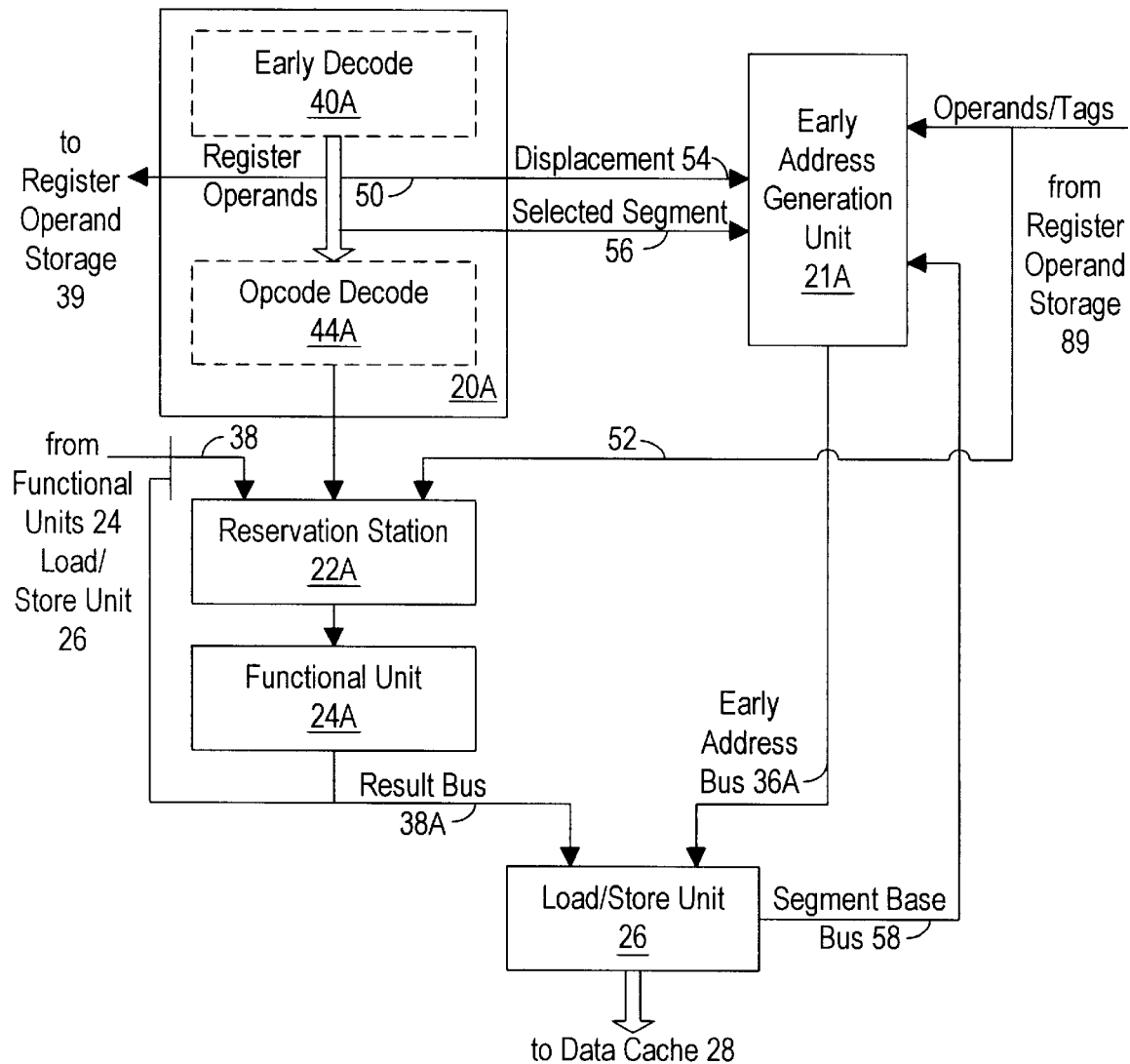
FIG. 3 is a block diagram of one embodiment of a decode unit, an early address generation unit, a reservation station, a functional unit, and a load/store unit shown in FIG. 1.

Turning next to FIG. 3, a block diagram of decode unit 20A, early address generation unit 21A, reservation station 22A, functional unit 24A, and load/store unit 26 is shown. Interconnections between the blocks according to one embodiment of microprocessor 10 are highlighted in FIG. 3. Interconnections between decode units 20B–20C, early address units 21B–21C, reservation stations 22B–22C, functional units 24B–24C, and load/store unit 26 may be similar. Additional interconnections may be included between the blocks for other purposes.

Early decode unit 40A selects the register operands and displacement from the instruction conveyed thereto from instruction alignment unit 18. The register operands are requested from register operand storage 39 (comprising reorder buffer 32 and register file 30) by conveying indications of the registers upon a register operand bus 50. Corresponding register operands (or reorder buffer tags to be captured from result buses 38) are conveyed upon operands/tags bus 52. Both early address generation unit 21A and reservation station 22A receive operands/tags bus 52 in order to capture the operands for the instruction. If register operands are provided for each operand used to form the data address (or if no register operands are used to form the data address), early address generation unit 21A forms the data address and conveys the data address to load/store unit 26 upon early address bus 36A. Early address bus 36A is one of early address buses 36 shown in FIG. 1.

In order to form the data address, early address generation unit 21A receives the displacement corresponding to the instruction from early decode unit 40A within decode unit 20A. If the instruction does not include a displacement, a zero displacement value is conveyed by decode unit 20A. A displacement bus 54 is included for this purpose.

In one embodiment, the data address formed by early address generation unit 21A is the linear data address including the segment base address from the segment register selected by the instruction. The selected segment register is identified by early decode unit 40A, and an indication of the selected segment is conveyed upon selected segment bus 56 to early address generation unit 21A. Early address generation unit 21A uses the selected segment indication to select one of the segment base addresses provided by load/store unit 26 upon segment base bus 58. A segment base address is provided upon segment base bus 58 corresponding to each segment register employed by microprocessor 10. In embodiments of microprocessor 10 employing the x86 microprocessor architecture, six segment base addresses are conveyed corresponding to the six x86 segment registers (i.e. CS, SS, DS, ES, FS, and GS). It is noted that early address generation units 21 may maintain duplicate copies of the segment registers instead of receiving the segment base addresses from load/store unit 26.

Reservation station 22A receives register operands or reorder buffer tags associated with the instruction upon operands/tag bus 52. Additionally, the decoded instruction including immediate and displacement data is conveyed from decode unit 20A. Reservation station 22A stores the instruction and operands until each operand has been provided. Result buses 38 (including result bus 38A from functional unit 24A) are coupled to reservation station 22A. Reservation station 22A scans the results provided upon result buses 38 by functional units 24 and load/store unit 26 for reorder buffer tags stored with respect to the instruction. When a result corresponding to the instruction is conveyed, reservation station 22A captures the result. The remaining operands used by the instruction are thereby provided. Upon receipt of the operands corresponding to the instruction, reservation station 22A may select the instruction for execution by functional unit 24A.

When receiving an instruction which performs a memory operation, functional unit 24A calculates the logical data address corresponding to the memory operation and forwards the logical address to load/store unit 26 upon result bus 38A. Load/store unit 26 subsequently adds the appropriate segment base address to the logical data address, forming the linear data address used to access data cache 28. If early address generation unit 21A previously provided the data address, load/store unit 26 ignores the data address provided by functional unit 24A.

Load/store unit 26 receives both the data address generated by early address generation unit 21A (upon early address bus 36A) and the data address generated by functional unit 24A (upon result bus 38A). Early address generation unit 21A indicates whether or not the data address conveyed therefrom is valid. If the data address is valid, load/store unit 26 stores the address in a load/store buffer and proceeds with performing the memory operation using the address. If the data address provided by early address generation unit 21A is invalid, load/store unit 26 awaits the data address from functional unit 24A. Upon receipt of the data address formed by functional unit 24A, load/store unit 26 may perform the memory operation. However, functional unit 24A provides a logical address. Load/store unit 26 adds the selected segment base address to the logical address formed by functional unit 24A prior to performing the memory operation. In one embodiment, load/store unit 26 determines if the selected segment base address is zero. If the selected segment base address is zero, load/store unit 26 proceeds with the address provided by functional unit 24A. The addition of the segment base address may thereby be bypassed. It is noted that a popular segmentation memory model employed by many operating systems for the x86 microprocessor architecture is the flat memory model, in which all segment base addresses are zero.

It is noted that the x86 segmentation mechanism includes a segment limit defining the maximum logical address allowable within the selected segment. Since load/store unit 26 receives a linear address with the segment base address already added from early address generation unit 21A, load/store unit 26 performs linear limit checking upon the received address. In other words, the segment limit is added to the segment base address to perform limit checking upon the linear address.

Figure 4:
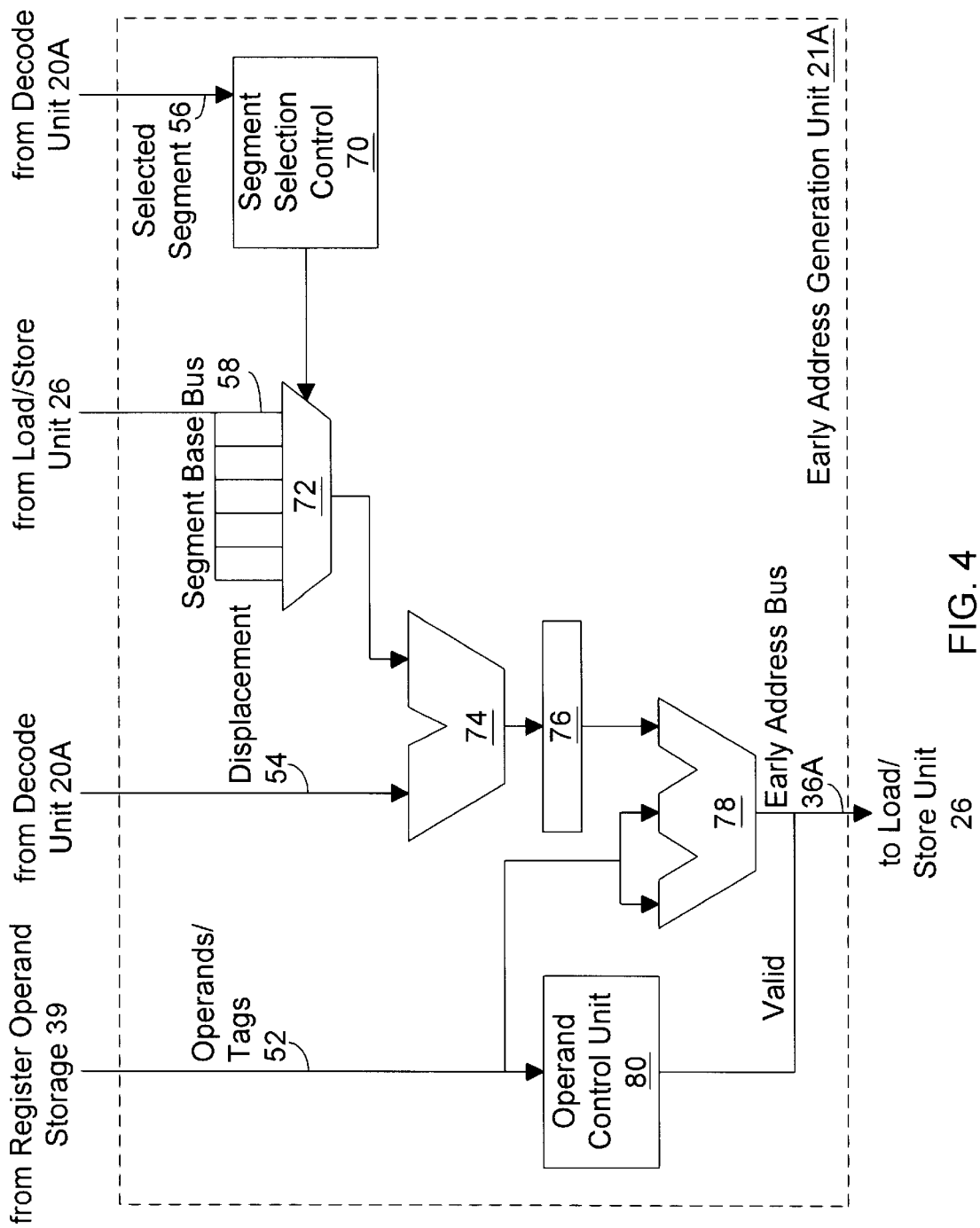
FIG. 4 is a diagram of one embodiment of the early address generation unit shown in FIG. 3.

Turning now to FIG. 4, a diagram of one embodiment of early address generation unit 21A is shown. Early address generation units 21B–21C may be configured similarly. Early address unit 21A includes a segment selection control unit 70, a selection circuit 72, a first adder circuit 74, a storage circuit 76, a second adder circuit 78, and an operand control unit 80. Segment selection control unit 70 is coupled to selected segment bus 56 and to selection circuit 72. Selection circuit 72 is further coupled to segment base bus 58 and to first adder circuit 74. First adder circuit 74 is additionally coupled to displacement bus 54 and to storage circuit 76. Storage circuit 76 is additionally coupled to second adder circuit 78, which is in turn coupled to operands/tags bus 52 and early address bus 36A. Finally, operand control unit 80 is coupled to operands/tags bus 52 and early address bus 36A.

First adder circuit 74 and second adder circuit 78 operate together to form a linear address comprising the segment base address, up to one displacement, and up to two register operands. First adder circuit 74 adds the segment base address and the displacement. The first sum produced by first adder circuit 74 is added to up to two register operands by second adder circuit 78. The displacement and segment base are added first since these values are available upon decode of the displacement field of the instruction. The register operand is decoded from the instruction and then requested from register operand storage 39. Therefore, the displacement and segment base address are added while the register operands are requested. In one particular embodiment, the register operands are provided in the clock cycle following the clock cycle in which the displacement is provided. Storage circuit 76 is provided to store the first sum, such that the first sum is available to second adder circuit 78 upon arrival of the register operands during the subsequent clock cycle. Storage circuit 76 may comprise a register, for example. For embodiments in which register operands are provided in the same clock cycle as the displacement (with sufficient time remaining in the clock cycle to perform the addition within second adder circuit 78), storage circuit 76 may be removed.

In the embodiment shown, second adder circuit 78 is a three input adder capable of adding the displacement/base sum (i.e. the first sum) produced by first adder circuit 74 to up to two register operands specified by the instruction. The resulting value comprises the linear address of the memory operation. Second adder circuit 78 conveys the linear address upon early address bus 36A. While second adder circuit 78 computes the linear address, operand control unit 80 examines the values provided upon operands/tags bus 52. If one or more register operands are indicated to be invalid (as an instruction outstanding within microprocessor 10 is going to update the register), then second adder circuit 78 is not producing the linear address. Operand control unit 80 indicates upon early address bus 36A whether or not the address conveyed by second adder circuit 80 is valid. Operand control unit 80 asserts the validity indicator if all register operands are provided. Conversely, if a register operand is not provided, operand control unit 80 deasserts the validity indicator.

As noted above, segment selection control unit 70 receives the indication of the selected segment register upon selected segment bus 56. The indication identifies the segment register selected by the instruction. Segment selection control unit 70 receives the indication and asserts control signals to selection circuit 72 in order to select the corresponding segment base address. The selected segment base address is thereby conveyed to first adder circuit 74. It is noted that selection circuit 72 may comprise a multiplexor circuit. Alternatively, multiple cascaded multiplexor circuits may be employed.

Figure 5:
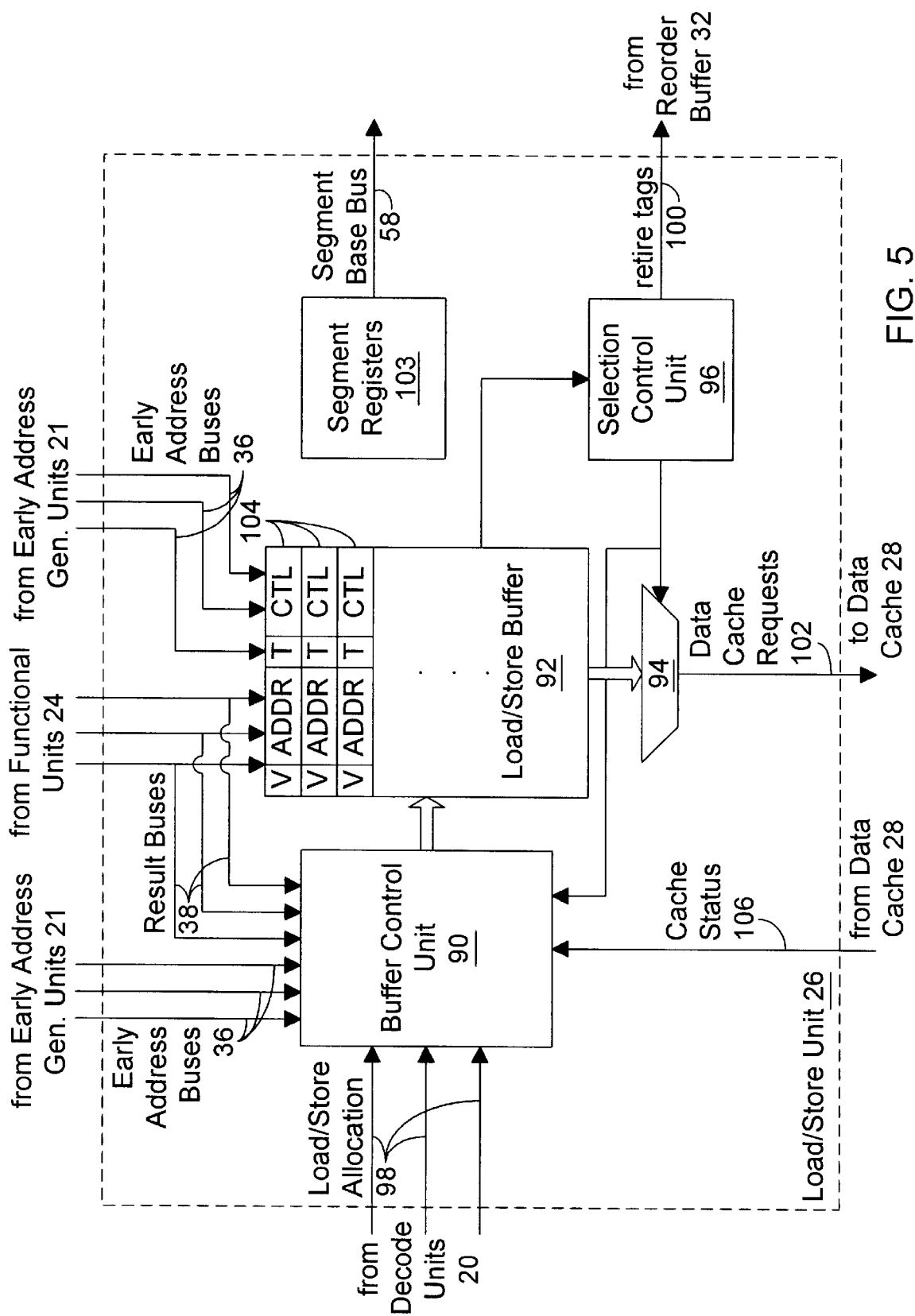
FIG. 5 is a diagram of one embodiment of the load/store unit shown in FIG. 3.

Turning now to FIG. 5, a diagram of one embodiment of load/store unit 26 is shown. Load/store unit 26 includes a buffer control unit 90, a load/store buffer 92, a selection circuit 94, and a selection control unit 96. Buffer control unit 90 is coupled to load/store buffer 92, early address buses 36, result buses 38, a plurality of load/store allocation buses 98, selection control unit 96, and a cache status bus 106. Load/store buffer 92 is coupled to result buses 38, early address buses 36, selection circuit 94, and selection control unit 96. Selection control unit 96 is further coupled to selection circuit 94 and to a retire tags bus 100 from reorder buffer 32. Selection circuit 94 is coupled to a data cache requests bus 102.

Buffer control unit 90 is configured to control load/store buffer 92. Buffer control unit allocates storage locations within load/store buffer 92 for each load or store memory operation requested by decode units 20. Decode units 20 provide allocation requests for load and/or store memory operations upon load/store allocation buses 98. A particular decode unit 20A–20C indicates whether the instruction being decoded includes a load memory operation, a store memory operation, or both a load and a store memory operation. Both a load and a store memory operation is indicated for the case in which a memory operand is both a source and destination operand for an instruction. Additionally, a reorder buffer tag corresponding to the instruction being decoded is provided upon load/store allocation buses 98. For each instruction requiring a memory operation, buffer control unit 90 allocates a storage location within load/store buffer 92. The reorder buffer tag corresponding to the instruction is stored into the allocated storage location. The "T" field within storage locations 104 of load/store buffer 92 store the reorder buffer tag, as well as a valid indication indicating that the entry is storing valid information.

Buffer control unit 90 operates load/store buffer 92 as a modified first-in, first-out (FIFO) queue. Newly allocated memory operations are stored at the end of the queue, such that memory operations in the queue remain in program order (i.e. in the order that the corresponding instructions occur in the instruction sequence being executed). Memory operations may be performed to data cache 28 out of order. If a memory operation is performed out of order and completes (i.e. hits in data cache 28), buffer control unit 90 shifts the memory operations subsequent to the out of order memory operation forward in the queue. In this manner, a storage location toward the end of the queue is vacated via deletion of the memory operation from the queue. Selection control unit 96 conveys indications of the memory operations selected for cache access during a clock cycle. Additionally, the cache status (i.e. hit/miss in data cache 28) is returned upon cache status bus 106. Buffer control unit 90 may determine from the type of memory operation (load or store) and the cache status that the memory operation is complete or is to be retained in load/store buffer 92 for future cache access. If the memory operation is a load or store performed in order and the memory operation is a hit, the memory operation may be deleted. If the memory operation is a load or in-order store and is a miss, the memory operation is retained. If the operation is an out of order store, the operation is retained until the operation is non-speculative, regardless of the hit or miss status. In one embodiment, eight storage locations 104 are included within load/store buffer 90.

Buffer control unit 90 maintains a pointer for indicating which storage location within load/store buffer 92 is currently the end of the queue. If decode units 20 receive instructions during a clock cycle which comprise more memory operations than available storage locations within load/store buffer 92 may accommodate, then decode units 20 receiving instructions which are subsequent to other instructions decoded during the clock cycle stall instruction dispatch until a storage location becomes available. Buffer control unit 90 conveys an indication of the number of available storage locations to decode units 20 to assist in determining such stall conditions.

The validity indications conveyed upon early address buses 36 are received by buffer control unit 90. If a validity indication is asserted upon one of early address buses 36, buffer control unit 90 selects the storage location 104 within load/store buffer 92 which is storing the corresponding memory operation. Because the early address for a particular memory operation is provided at a fixed time with respect to that memory operation arriving upon load/store allocation buses 98, the reorder buffer tag for the operation is not needed to locate the corresponding memory operation. The selected storage location 104 is updated with the data address provided upon early address buses 36. Storage locations 104 store the data address in the "ADDR" field. Additionally, a valid indication for the data address (stored in the "V" field) is set to indicate that the data address has been provided.

Similarly, the reorder buffer tags and validity indications conveyed upon result buses 38 are received by buffer control unit 90. However, buffer control unit 90 does not only locate the storage location 104 which is storing the matching reorder buffer tag. In addition, prior to selecting the storage location to store the data address provided upon the result bus 38, buffer control unit 90 ensures that a data address has not previously been provided for the storage location. Particularly, if the "V" field is not set, then the data address has not yet been provided and the storage location 104 is selected to receive the data address from result buses 38. If the "V" field of the storage location 104 is set, then early address generation units 21 previously provided the data address. The data address provided by functional units 24 is ignored if the "V" field is set.

Each storage location 104 includes a "CTL" field in addition to the "V", "ADDR", and "T" fields. The "CTL" field stores control information regarding the memory operation. For example, the load, store, or load and store nature of the operation is stored therein. Additionally, store data for store memory operations is stored therein. If a memory operation has accessed data cache 28 and missed, a miss indication within the "CTL" field is set. Operand size and misalignment information may additionally be stored in the "CTL" field. Various other control information may be stored in the "CTL" field for various embodiments.

Selection control unit 96 may employ any selection criteria to select memory operations for presentation to data cache 28. In particular, speculative load accesses may be performed. Still further, speculative store accesses may be performed. Selection control unit 96 applies the selection criteria to the operations stored in load/store buffer 92 during a clock cycle, and selects up to two operations for cache access. Selection controls are asserted to selection circuit 94, which conveys the selected requests upon data cache requests bus 102. Additionally, the selection controls are conveyed to buffer control unit 90. The selection controls identify for buffer control unit 90 which storage locations 104 are storing memory operations which are accessing the cache. Upon receipt of corresponding cache status information (i.e. cache hit/miss), buffer control unit 90 may discard the memory operation from the queue or retain the memory operation, as discussed above. It is noted that selection circuit 94 may comprise one or more multiplexor circuits coupled to receive selection controls from selection control unit 96.

Selection control unit 96 further receives reorder buffer tags indicative of instructions having load/store memory operations. The instructions indicated are ready to be retired (e.g. other instructions prior to the instructions in the instruction sequence have been retired). If memory operations corresponding to the indicated instructions are within load/store buffer 92, these memory operations are selected for completion. For example, if the memory operations previously accessed data cache 28 and missed, the data is fetched from the main memory subsystem. The memory operations may thereby be completed and discarded from load/store buffer 92. The instructions may complete execution and retire as well. It is noted that selection control circuit 96 may indicate retiring memory operations to buffer control unit 90. Buffer control unit 90 may thereby delete retained store memory operations which previously hit within load/store buffer 92.

Load/store unit 26 further includes a plurality of segment registers within segment register block 103. Segment base bus 58 is coupled to segment register block 103. The segment base addresses corresponding to each segment register within segment register block 103 are conveyed upon segment base bus 58.

Figure 6:
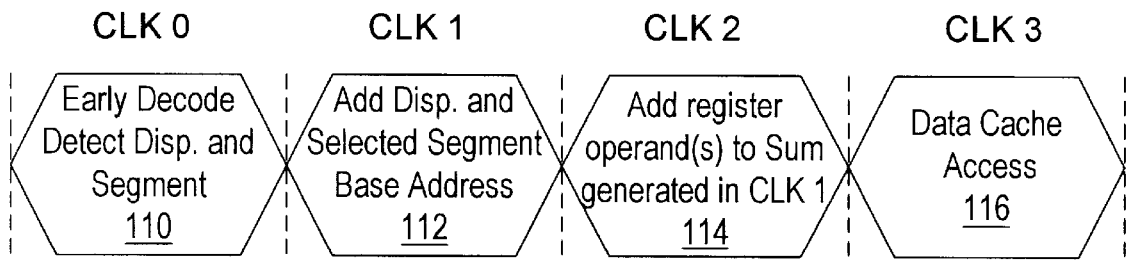
FIG. 6 is a timing diagram of events occurring when the early address generation unit forms the data address used by the load/store unit.

Turning now to FIG. 6, a timing diagram depicting an exemplary set of events corresponding to a memory operation for which early address generation units 21 provide the address is shown. Clock cycles are indicated by vertical dashed lines in FIG. 6.

During a clock cycle CLK0, an early decode unit 40 within a decode unit 20 decodes the displacement and selected segment from an instruction (block 110). The displacement and an indication of the segment is conveyed to the corresponding early address generation unit 21. During a clock cycle CLK1, the early address generation unit 21 adds the displacement to a segment base address corresponding to the selected segment (block 112). The sum generated during CLK1 is added to one or more register operands received by the early address generation unit 21 during a clock cycle CLK2 (block 114). The sum generated during CLK2 is forwarded to load/store unit 26. During a clock cycle CLK3, the data cache access corresponding to the memory operation may be performed (block 116). If memory operations within load/store buffer 92 are ready for data cache access, block 116 may be performed in a clock cycle subsequent to clock cycle CLK3. The timing shown in FIG. 6 assumes that the memory operation whose address is generated during clock cycles CLK1 and CLK2 is selected for data cache access upon receipt of the calculated address.

Figure 7:
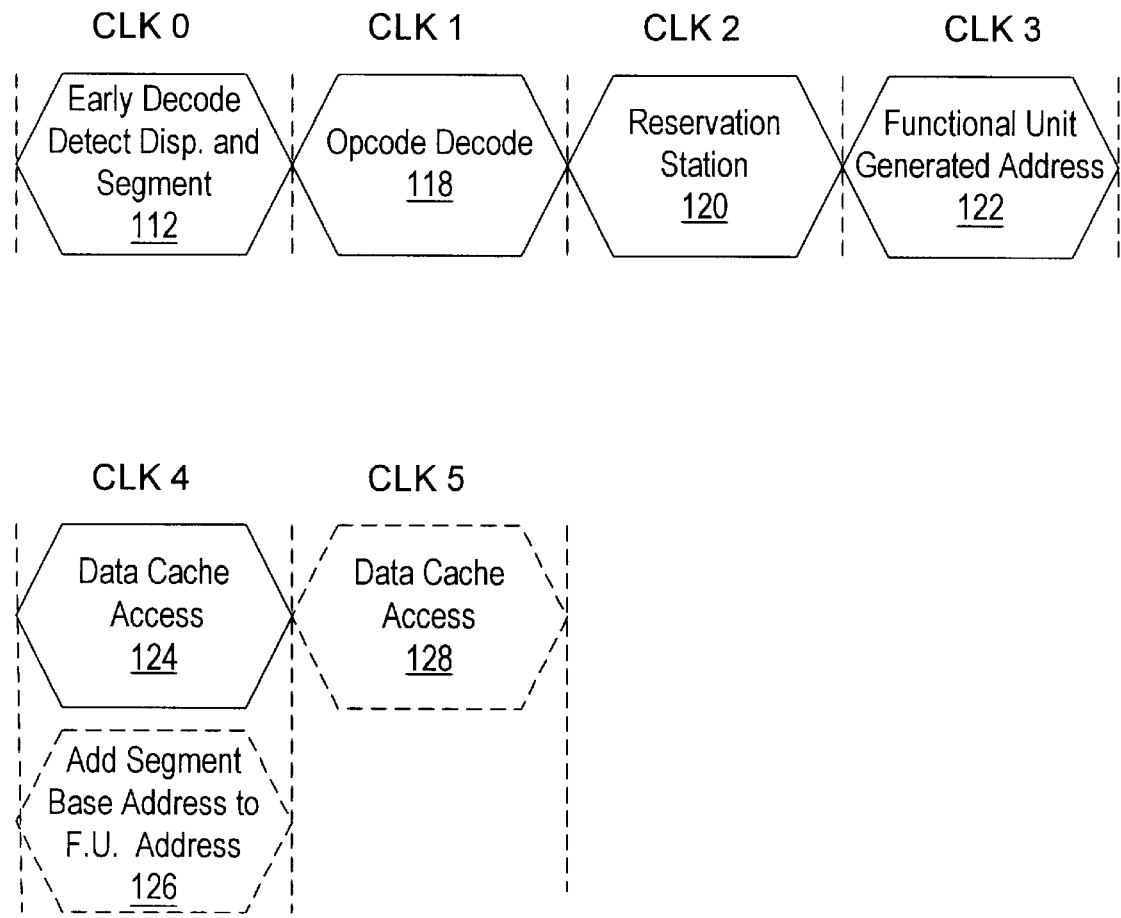
FIG. 7 is a timing diagram of events occurring when the functional unit forms the data address used by the load/store unit.

Turning now to FIG. 7, a timing diagram depicting an exemplary set of events corresponding to a memory operation for which functional units 24 provide the address is shown. Similar to FIG. 6, clock cycles are indicated by vertical dashed lines in FIG. 7.

During clock cycle CLK0, an early decode unit 40 within a decode unit 20 decodes a displacement and selected segment from an instruction (block 110, similar to FIG. 6). During clock cycles CLK1 and CLK2, the corresponding early address generation unit 21 attempts to form the data address for the memory operation. However, early address generation unit 21 is unsuccessful due to the unavailability of a register operand. During clock cycle CLK1, the instruction is decoded in an opcode decode unit 44 within the decode unit 20 (block 118). The decoded instruction is conveyed to a reservation station 22 during clock cycle CLK2 (block 120). Once the register operands used to form the data address become available, the reservation station 22 conveys the instruction to the functional unit 24 for logical address generation (block 122). In the example shown, functional unit 24 generates the logical address during clock cycle CLK3. However, multiple clock cycles may be inserted between clock cycle CLK2 and clock cycle CLK3. The number of clock cycles inserted depends upon the number of clock cycles required by microprocessor 10 to generate the register operands used to form the logical address.

If the logical address is formed in clock cycle CLK3, the data cache access may be performed in clock cycle CLK4 (block 124). The timing shown assumes that the selected segment for the logical address includes a segment base address of zero. If the segment base address is not zero, the segment base address is added to the logical address formed in clock cycle CLK3 (block 126). Data cache access may then be performed in clock cycle CLK5 (block 128).

As FIGS. 6 and 7 indicate, microprocessor 10 may achieve 1–2 clock cycles of latency decrease for memory operations when early address generation units 21 are included. Advantageously, load memory operations may complete more rapidly than was previously achievable. Performance of microprocessor 10 may be increased if the register operands used to form a data address for an instruction are often available at the time the instruction is decoded. Furthermore, instructions which are dependent upon the load memory operation may receive their operands more quickly. Performance may be increased due to the increased instruction throughput made possible by the reduced latency for memory operations.

Figure 8:
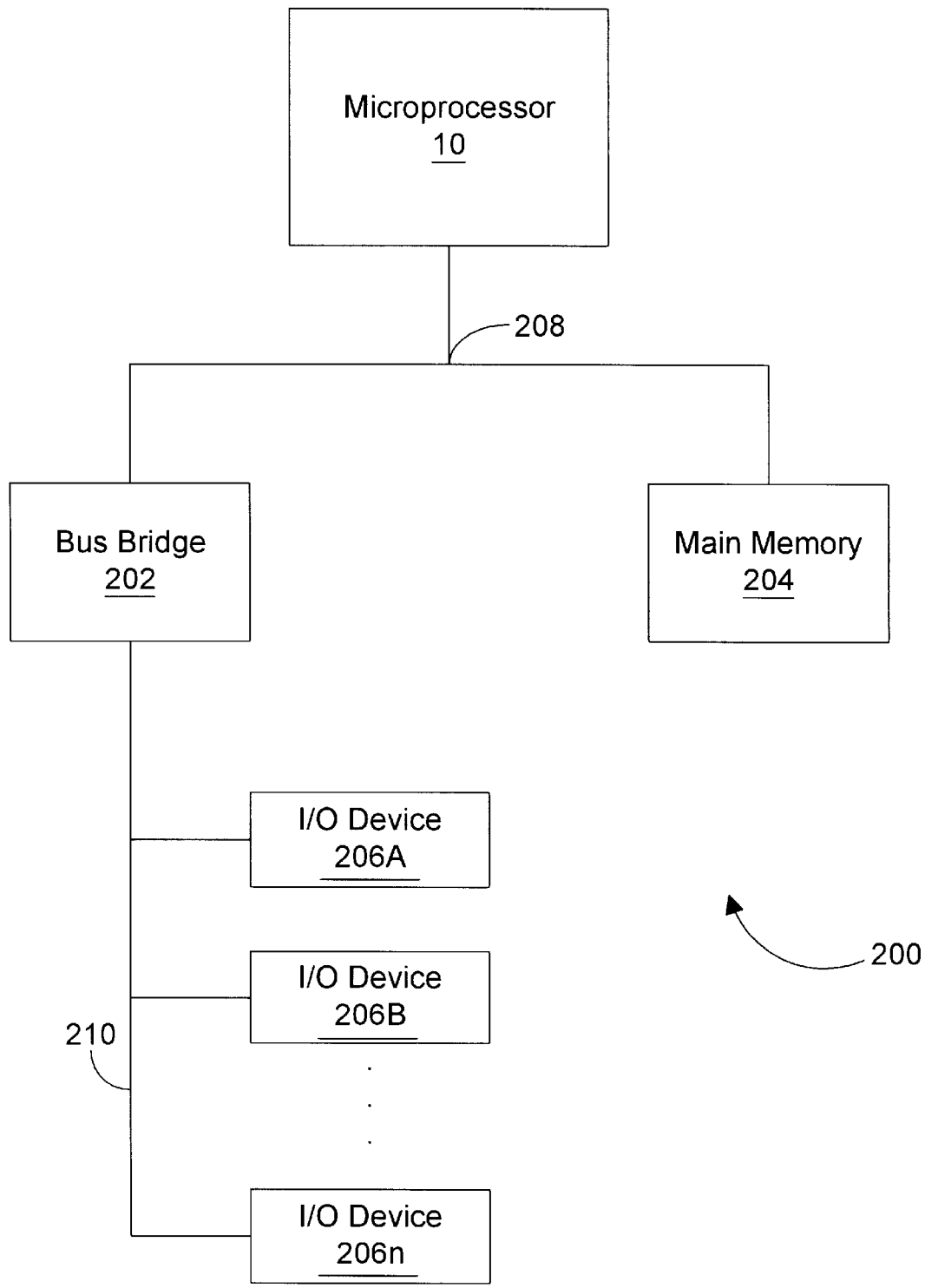
FIG. 8 is a block diagram of a computer system including the microprocessor shown in FIG. 1.

Turning now to FIG. 8, a computer system 200 including microprocessor 10 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 10, bus bridge 202, and main memory 204 are coupled to a system bus 208. I/O devices 206 are coupled to an I/O bus 210 for communication with bus bridge 202.

Bus bridge 202 is provided to assist in communications between I/O devices 206 and devices coupled to system bus 208. I/O devices 206 typically require longer bus clock cycles than microprocessor 10 and other devices coupled to system bus 208. Therefore, bus bridge 202 provides a buffer between system bus 208 and input/output bus 210. Additionally, bus bridge 202 translates transactions from one bus protocol to another. In one embodiment, input/output bus 210 is an Enhanced Industry Standard Architecture (EISA) bus and bus bridge 202 translates from the system bus protocol to the EISA bus protocol. In another embodiment, input/output bus 210 is a Peripheral Component Interconnect (PCI) bus and bus bridge 202 translates from the system bus protocol to the PCI bus protocol. It is noted that many variations of system bus protocols exist. Microprocessor 10 may employ any suitable system bus protocol.

I/O devices 206 provide an interface between computer system 200 and other devices external to the computer system. Exemplary I/O devices include a modem, a serial or parallel port, a sound card, etc. I/O devices 206 may also be referred to as peripheral devices. Main memory 204 stores data and instructions for use by microprocessor 10. In one embodiment, main memory 204 includes at least one Dynamic Random Access Memory (DRAM) and a DRAM memory controller.

It is noted that although computer system 200 as shown in FIG. 6 includes one bus bridge 202, other embodiments of computer system 200 may include multiple bus bridges 202 for translating to multiple dissimilar or similar I/O bus protocols. Still further, a cache memory for enhancing the performance of computer system 200 by storing instructions and data referenced by microprocessor 10 in a faster memory storage may be included. The cache memory may be inserted between microprocessor 10 and system bus 208, or may reside on system bus 208 in a "lookaside" configuration.

It is noted that the x86 microprocessor architecture, including its segmentation mechanism, have been used herein as a specific example. However, any microprocessor architecture employing a mechanism whereby a logical address formed from the operands of an instruction is added to a value generated by an address translation mechanism to produce a translated address may benefit from the present invention. Such embodiments are contemplated, and are intended to be within the spirit and scope of the present invention as defined in the appended claims.

It is noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Table 1 below indicates fast path, double dispatch, and MROM instructions for one embodiment of microprocessor 10 employing the x86 instruction set:

TABLE 1 x86 Fast Path, Double Dispatch, and MROM Instructions

| x86 Instruction | Instruction Category |
| --- | --- |
| AAA | MROM |
| AAD | MROM |
| AAM | MROM |
| AAS | MROM |
| ADC | fast path |
| ADD | fast path |
| AND | fast path |
| ARPL | MROM |
| BOUND | MROM |
| BSE | fast path |
| BSR | fast path |
| BSWAP | MROM |
| BT | fast path |
| BTC | fast path |
| BTR | fast path |
| BTS | fast path |
| CALL | fast path |
| CBW | fast path |
| CWDE | fast path |
| CLC | fast path |
| CLD | fast path |
| CLI | MROM |
| CLTS | MROM |
| CMC | fast path |
| CMP | fast path |
| CMPS | MROM |
| CMPSB | MROM |
| CMPSW | MROM |
| CMPSD | MROM |
| CMPXCHG | MROM |
| CMPXCHG8B | MROM |
| CPUID | MROM |
| CWD | MROM |
| CWQ | MROM |
| DDA | MROM |
| DAS | MROM |
| DEC | fast path |
| DIV | MROM |
| ENTER | MROM |
| HLT | MROM |
| IDIV | MROM |
| IMUL | double dispatch |
| IN | MROM |
| INC | fast path |
| INS | MROM |
| INSB | MROM |
| INSW | MROM |
| INSD | MROM |
| INT | MROM |
| INTO | MROM |
| INVD | MROM |
| INVLPG | MROM |
| IRET | MROM |
| IRETD | MROM |
| Jcc | fast path |
| JCXZ | double dispatch |
| JECXZ | double dispatch |
| JMP | fast path |
| LAHF | fast path |
| LAR | MROM |
| LDS | MROM |
| LES | MROM |

TABLE 1-continued x86 Fast Path, Double Dispatch, and MROM Instructions

| x86 Instruction | Instruction Category |
| --- | --- |
| LFS | MROM |
| LGS | MROM |
| LSS | MROM |
| LEA | fast path |
| LEAVE | double dispatch |
| LGDT | MROM |
| LIDT | MROM |
| LLDT | MROM |
| LMSW | MROM |
| LODS | MROM |
| LODSB | MROM |
| LODSW | MROM |
| LODSD | MROM |
| LOOP | double dispatch |
| LOOPcond | MROM |
| LSL | MROM |
| LTR | MROM |
| MOV | fast path |
| MOVCC | fast path |
| MOV CR | MROM |
| MOV DR | MROM |
| MOVS | MROM |
| MOVSB | MROM |
| MOVSW | MROM |
| MOVSD | MROM |
| MOVSX | fast path |
| MOVZX | fast path |
| MUL | double dispatch |
| NEG | fast path |
| NOP | fast path |
| NOT | fast path |
| OR | fast path |
| OUT | MROM |
| OUTS | MROM |
| OUTSB | MROM |
| OUTSW | MROM |
| OUTSD | MROM |
| POP | double dispatch |
| POPA | MROM |
| POPAD | MROM |
| POPF | MROM |
| POPFD | MROM |
| PUSH | double dispatch |
| PUSHA | MROM |
| PUSHAD | MROM |
| PUSHF | fast path |
| PUSHFD | fast path |
| RCL | MROM |
| RCR | MROM |
| ROL | fast path |
| ROR | fast path |
| RDMSR | MROM |
| REP | MROM |
| REPE | MROM |
| REPZ | MROM |
| REPNE | MROM |
| REPNZ | MROM |
| RET | double dispatch |
| RSM | MROM |
| SAHF | fast path |
| SAL | fast path |
| SAR | fast path |
| SHL | fast path |
| SHR | fast path |
| SBB | fast path |
| SCAS | MROM |
| SCASB | MROM |
| SCASW | MROM |
| SCASD | MROM |
| SETcc | fast path |
| SGDT | MROM |
| SIDT | MROM |
| SHLD | MROM |
| SHRD | MROM |
| SLDT | MROM |
| SMSW | MROM |
| STC | fast path |
| STD | fast path |
| STI | MROM |
| STOS | MROM |
| STOSB | MROM |
| STOSW | MROM |
| STOSD | MROM |
| STR | MROM |
| SUB | fast path |
| TEST | fast path |
| VERR | MROM |
| VERW | MROM |
| WBINVD | MROM |
| WRMSR | MROM |
| XADD | MROM |
| XCHG | MROM |
| XLAT | fast path |
| XLATB | fast path |
| XOR | fast path |

Note: Instructions including an SIB byte are also considered fast path instructions.

It is noted that a superscalar microprocessor in accordance with the foregoing may further employ the latching structures as disclosed within the co-pending, commonly assigned patent application entitled "Conditional Latching Mechanism and Pipelined Microprocessor Employing the Same", Ser. No. 08/400,608 filed Mar. 8, 1995, by Pflum et al. The disclosure of this patent application is incorporated herein by reference in its entirety.

It is further noted that aspects regarding array circuitry may be found in the co-pending, commonly assigned patent application entitled "High Performance Ram Array Circuit Employing Self-Time Clock Generator for Enabling Array Access", Ser. No. 08/473,103 filed Jun. 7, 1995 by Tran. The disclosure of this patent application is incorporated herein by reference in its entirety.

It is additionally noted that other aspects regarding superscalar microprocessors may be found in the following co-pending, commonly assigned patent applications: "Linearly Addressable Microprocessor Cache", Ser. No. 08/146,381, filed Oct. 29, 1993 by Witt; "Superscalar Microprocessor Including a High Performance Instruction Alignment Unit", Ser. No. 08/377,843, filed Jan. 25, 1995 by Witt, et al; "A Way Prediction Structure", Ser. No. 08/522,181, filed Aug. 31, 1995 by Roberts, et al; "A Data Cache Capable of Performing Store Accesses in a Single Clock Cycle", Ser. No. 08/521,627, filed Aug.31, 1995 by Witt, et al; "A Parallel and Scalable Instruction Scanning Unit", Ser. No. 08/475,400, filed Jun. 7, 1995 by Narayan; and "An Apparatus and Method for Aligning Variable-Byte Length Instructions to a Plurality of Issue Positions", Ser. No. 08/582,473, filed Jan. 2, 1996 by Tran, et al. The disclosure of these patent applications are incorporated herein by reference in their entirety.

In accordance with the above disclosure, an apparatus has been described which begins the address generation for memory operations upon decode of an instruction if the operands are available. Additionally, the segment base address corresponding to the segment selected by the instruction is added to the displacement prior to receiving the register operands. In other words, logical and linear address generation are combined. Advantageously, data access latency may be decreased by 1–2 clock cycles as compared to generating the address through functional units.

Memory operations and the instructions which depend thereon may enjoy decreased latency. Microprocessor performance may thereby be increased.

Numerous variations and modifications will become apparent to those skilled in the art once the above disclosure is fully appreciated. It is intended that the following claims be interpreted to embrace all such variations and modifications.

What is claimed is:

1. An apparatus for computing a data address, comprising:
   a decode unit configured to decode an instruction, wherein said decode unit is configured to receive a displacement if said displacement is available, a segment base address stored in a selected segment register if said segment base address is available, and a register operand if said register operand is available, each of said displacement, said segment base address and said register operand corresponding to said instruction;
   a register operand storage coupled to receive an indication of said register operand from said decode unit, wherein said register operand storage is configured to store said register operand upon generation of said register operand via execution of another instruction prior to said instruction in an instruction code sequence, and wherein said register operand storage is configured to convey said register operand upon receipt of said indication if said register operand is stored therein, and wherein said register operand storage is configured to convey a tag identifying said register operand if said register operand is absent upon receipt of said indication;
   an early address generation unit coupled to said decode unit and to said register operand storage, wherein said early address generation unit is configured to generate a first data address corresponding to said instruction, and wherein said early address generation unit is further configured to assert a validity indication if said register operand is received from said register operand storage, and wherein said early address generation unit is further configured to assert said validity indication if said instruction excludes said register operand, and wherein said early address generation unit is configured to generate said first data address by adding said displacement to said segment base address and further adding said register operand, if included;
   a functional unit coupled to receive said displacement and said register operand, wherein said functional unit is configured to generate a second data address by adding said displacement to said register operand, if included; and
   a load/store unit coupled to said early address generation unit and said functional unit, wherein said load/store unit receives said first data address and said second data address, and wherein said load/store unit selects between said first data address and said second data address in response to said validity indication provided by said early address generation unit.

2. The apparatus as recited in claim 1 wherein said register operand storage comprises a reorder buffer and a register file.

3. The apparatus as recited in claim 2 wherein said reorder buffer is configured to provide said tag if said register operand is not stored within said reorder buffer and said another instruction is stored within said reorder buffer.

4. The apparatus as recited in claim 2 wherein said reorder buffer is configured to provide said register operand if said another instruction is stored within said reorder buffer and said register operand is stored within said reorder buffer.

5. The apparatus as recited in claim 2 wherein said register file is configured to provide said register operand if said another instruction is not stored within said reorder buffer.

6. The apparatus as recited in claim 1 wherein said load/store unit receives said first data address during a first clock cycle prior to a second clock cycle in which said load/store unit receives said second data address.

7. The apparatus as recited in claim 6 wherein said load/store unit performs a cache access upon receipt of said first data address if said validity indication is asserted.

8. The apparatus as recited in claim 6 wherein said load/store unit is configured to ignore said second data address if said validity indication is asserted upon receipt of said first data address.

9. The apparatus as recited in claim 6 wherein said load/store unit is configured to add said segment base address to said second data address upon receipt of said second data address if said validity indication is deasserted upon receipt of said first data address.

10. The apparatus as recited in claim 9 wherein said load/store unit is configured to perform a cache access subsequent to adding said segment base if said validity indication is deasserted.

11. The apparatus as recited in claim 1 wherein said load/store unit is configured to select said first data address if said validity indication is asserted, and wherein said load/store unit is configured to select said second data address if said validity indication is deasserted.

12. A method for efficient data address generation, comprising:
   beginning generation of a first data address corresponding to an instruction upon decode of said instruction;
   beginning generation of a second data address corresponding to said instruction subsequent to said decode of said instruction:
   completing generation of said first data address, wherein if a register operand is required by said instruction to form said first data address, said first data address is invalid if said register operand is not provided, and valid if said register operand is provided;
   selecting said first data address into a load/store unit if said first data address is valid; completing generation of said second data address;
   selecting said second data address into said load/store unit if said first data address is invalid; and executing said instruction.

13. The method as recited in claim 12 further comprising generating said first data address if said instruction does not requires said register operand.

14. The method as recited in claim 13 further comprising selecting said first data address into said load/store unit if said register operand is not required by said instruction.

15. The method as recited in claim 12 wherein said first data address comprises a first sum of a segment base address corresponding to a segment register specified by said instruction and a displacement specified by said instruction.

16. The method as recited in claim 15 wherein said first sum further comprises said register operand.

17. The method as recited in claim 16 wherein said second data address comprises a second sum of said displacement and said register operand.

18. The method as recited in claim 17 wherein said first sum and said second sum further comprise a second register operand.

* * * * *